United States Patent
Inaba

(10) Patent No.: US 9,902,060 B2
(45) Date of Patent: Feb. 27, 2018

(54) ROBOT CONTROL SYSTEM PROVIDED WITH FUNCTION OF CHANGING CRITERION FOR COMMUNICATION QUALITY IN ACCORDANCE WITH DISTANCE BETWEEN MACHINE AND PORTABLE WIRELESS OPERATION PANEL

(71) Applicant: FANUC CORPORATION, Yamanashi (JP)

(72) Inventor: Ryoutarou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 15/067,180

(22) Filed: Mar. 11, 2016

(65) Prior Publication Data

US 2016/0271794 A1 Sep. 22, 2016

(30) Foreign Application Priority Data

Mar. 19, 2015 (JP) .................................. 2015-056856

(51) Int. Cl.
*B25J 13/00* (2006.01)
*B25J 9/16* (2006.01)
(Continued)

(52) U.S. Cl.
CPC .......... *B25J 9/1602* (2013.01); *G05B 19/414* (2013.01); *H04W 76/045* (2013.01); *G01S 5/16* (2013.01);
(Continued)

(58) Field of Classification Search
CPC ...... B25J 9/1602; B25J 9/1676; H04W 4/023; H04W 76/045; G01S 11/06; G01S 5/16;
(Continued)

(56) References Cited

U.S. PATENT DOCUMENTS

| | | | | |
|---|---|---|---|---|
| 8,032,253 B2 * | 10/2011 | Nagata | ..................... | B25J 19/06 180/2.1 |
| 9,278,447 B2 * | 3/2016 | Tachiwa | ..................... | B25J 9/16 |
| 2005/0244260 A1 | 11/2005 | Deplano | | |
| 2007/0063834 A1 * | 3/2007 | Bozzone | ................ | A63H 30/04 340/539.1 |

(Continued)

FOREIGN PATENT DOCUMENTS

| JP | 2-262988 A | 10/1990 |
|---|---|---|
| JP | 2004-314255 A | 11/2004 |

(Continued)

*Primary Examiner* — Dalena Tran
(74) *Attorney, Agent, or Firm* — Hauptman Ham, LLP

(57) ABSTRACT

A robot control system of the present invention includes: a control device for controlling a machine; a portable wireless operation panel that can perform wireless communication with the control device to control the machine; a distance measuring unit that measures the distance between the machine and the portable wireless operation panel; a communication monitoring unit that monitors the communication quality of wireless communication between the control device and the portable wireless operation panel; a warning generator that emits a warning to the operator or stops the machine when the communication quality becomes lower than a predetermined criterion; and, a criterion changing unit that changes the predetermined criterion in accordance with the distance between the machine and the portable wireless operation panel.

7 Claims, 7 Drawing Sheets

(51) Int. Cl.
*H04W 76/04* (2009.01)
*G05B 19/414* (2006.01)
*H04B 17/309* (2015.01)
*G01S 5/16* (2006.01)
*G01S 11/06* (2006.01)

(52) U.S. Cl.
CPC ..... *G01S 11/06* (2013.01); *G05B 2219/31081* (2013.01); *H04B 17/309* (2015.01)

(58) Field of Classification Search
CPC ........... G05B 2219/31081; G05B 2219/39082; G05B 2219/39097; H04B 17/309; H04B 5/0062
USPC ............ 700/264; 455/456.1, 456.6; 345/168, 345/169, 173
See application file for complete search history.

(56) References Cited

U.S. PATENT DOCUMENTS

| | | | |
|---|---|---|---|
| 2009/0030550 | A1 | 1/2009 | Nagata et al. |
| 2009/0204261 | A1* | 8/2009 | Strand .................... B25J 9/1656 700/264 |
| 2015/0197010 | A1* | 7/2015 | Ruuspakka ............ B25J 9/1664 700/245 |

FOREIGN PATENT DOCUMENTS

| | | |
|---|---|---|
| JP | 2005-196441 A | 7/2005 |
| JP | 2007-233817 A | 9/2007 |
| JP | 2012-223831 A | 11/2012 |
| JP | 5492438 B2 | 5/2014 |
| WO | 2006/103838 A1 | 10/2006 |
| WO | 2013/105264 A1 | 7/2013 |

* cited by examiner

ROBOT CONTROL SYSTEM PROVIDED WITH FUNCTION OF CHANGING CRITERION FOR COMMUNICATION QUALITY IN ACCORDANCE WITH DISTANCE BETWEEN MACHINE AND PORTABLE WIRELESS OPERATION PANEL

RELATED APPLICATIONS

The present application claims priority to Japanese Patent Application Number 2015-056856, filed Mar. 19, 2015, the disclosure of which is hereby incorporated by reference herein in its entirety.

BACKGROUND OF THE INVENTION

1. Field of the Invention

The present invention relates to a robot control system, in particular, relating to a robot control system provided with a function of changing the criterion for communication quality in accordance with the distance between a machine and a portable wireless operation panel.

2. Description of the Related Art

A portable operation panel for teaching a robot is required to satisfy the standard (ISO 10218-1) that the operation panel can output signals to perform an emergency stop of the robot so as to be able to promptly stop the robot in an emergency. When a portable operation panel is used based on wireless communication, there is a risk that the robot cannot be stopped promptly if the quality of the wireless communication is low, and hence is hazardous. For this reason, it has been a practice that the robot is stopped when the quality of wireless communication becomes lower than a certain level to thereby ensure safety.

However, the communication quality of wireless communication may be degraded by environmental influences such as the existence of obstacles, other wireless communications and the like, hence it is inconvenient if the criterion for stopping the robot due to the communication quality is strict. On the other hand, if the criterion is loosened, there is a risk that a long time is taken to correctly transmit an emergency stop signal when teachings and other hazardous tasks are executed, causing safety problems.

As a conventional robot control system, there has been a known system which ensures safety by recognizing the position of the operator (e.g., Japanese Patent No. 5492438). However, this disclosure in no way refers to the feature that the criterion for communication quality is changed.

As a wireless teaching device, there has been a known automated machine system which, by exchanging live signals by wireless communication at predetermined intervals and monitoring the time interval of reception so as to detect the wireless communication state, gives warnings to the operator and stops the automated machine when the wireless communication state becomes poor (Japanese Unexamined Patent Publication (Kokai) No. 2007-233817). This conventional art refers to a technique of confirming communication quality based on the interval between live signals to just give a warning or stop the system when the interval exceeds a certain level. That is, this conventional art does not include any reference to changing the criterion for communication quality depending on a distance. There is a description that parameters are introduced so as to adjust the criterion. That is, the criterion is assumed to be simply adjusted by the operator after grasping the current communication quality. However, there is no reference to using a method based on an automatic change of the criterion in accordance with some physical quantities.

There is another known automated machine system which, by monitoring the intensity of radio waves between the controller and the teaching device, gives warnings and/or stops the automated machine when the intensity of radio waves becomes equal to or lower than a predetermined threshold value (for example, International Publication 2006/103838). FIG. 1 shows a configuration of a conventional automated machine system. A conventional automated machine system 1000 is adapted to stop a robot 1001 when the quality of communication between a transceiver 1021 of a control device 1002 for controlling the robot 1001 and a transceiver 1041 of a teaching device 1004 degrades, to thereby ensure safety.

For example, as shown in FIG. 1, data (live data: $d_L$) for confirming that radio communication is performed correctly is exchanged every fixed period of time. When communication quality is good, live data $d_L$ can be received in the fixed period from time $t_1$ to $t_2$. Under such a circumstance, the robot 1001 is operated. On the other hand, when $d_L$ can be received at time $t_1$ but cannot be received at time $t_2$, a warning is generated or the robot 1001 is stopped. However, despite the fact that the operator is kept a certain distance apart from the robot and in safety, if wireless communication degrades, the robot is promptly stopped, giving rise to inconvenience.

SUMMARY OF THE INVENTION

In order to solve the above problem it is therefore an object of the present invention to provide a robot control system that can improve convenience without losing safety, by measuring the distance between a robot and a portable wireless operation panel and changing the safety criterion for wireless communication quality in accordance with the distance.

A robot control system according to one aspect of the present invention includes: a control device for controlling a machine; a portable wireless operation panel that can perform wireless communication with the control device to control the machine; a distance measuring unit that measures the distance between the machine and the portable wireless operation panel; a communication monitoring unit that monitors the communication quality of wireless communication between the control device and the portable wireless operation panel; a warning generator that emits a warning to the operator or stops the machine when the communication quality becomes lower than a predetermined criterion; and, a criterion changing unit that changes the predetermined criterion in accordance with the distance between the machine and the portable wireless operation panel.

BRIEF DESCRIPTION OF THE DRAWINGS

The object, features and advantages of the present invention will be better understood by reading the following description of the embodiments, taken together with the drawings wherein.

DETAILED DESCRIPTION OF THE INVENTION

Figure 1:
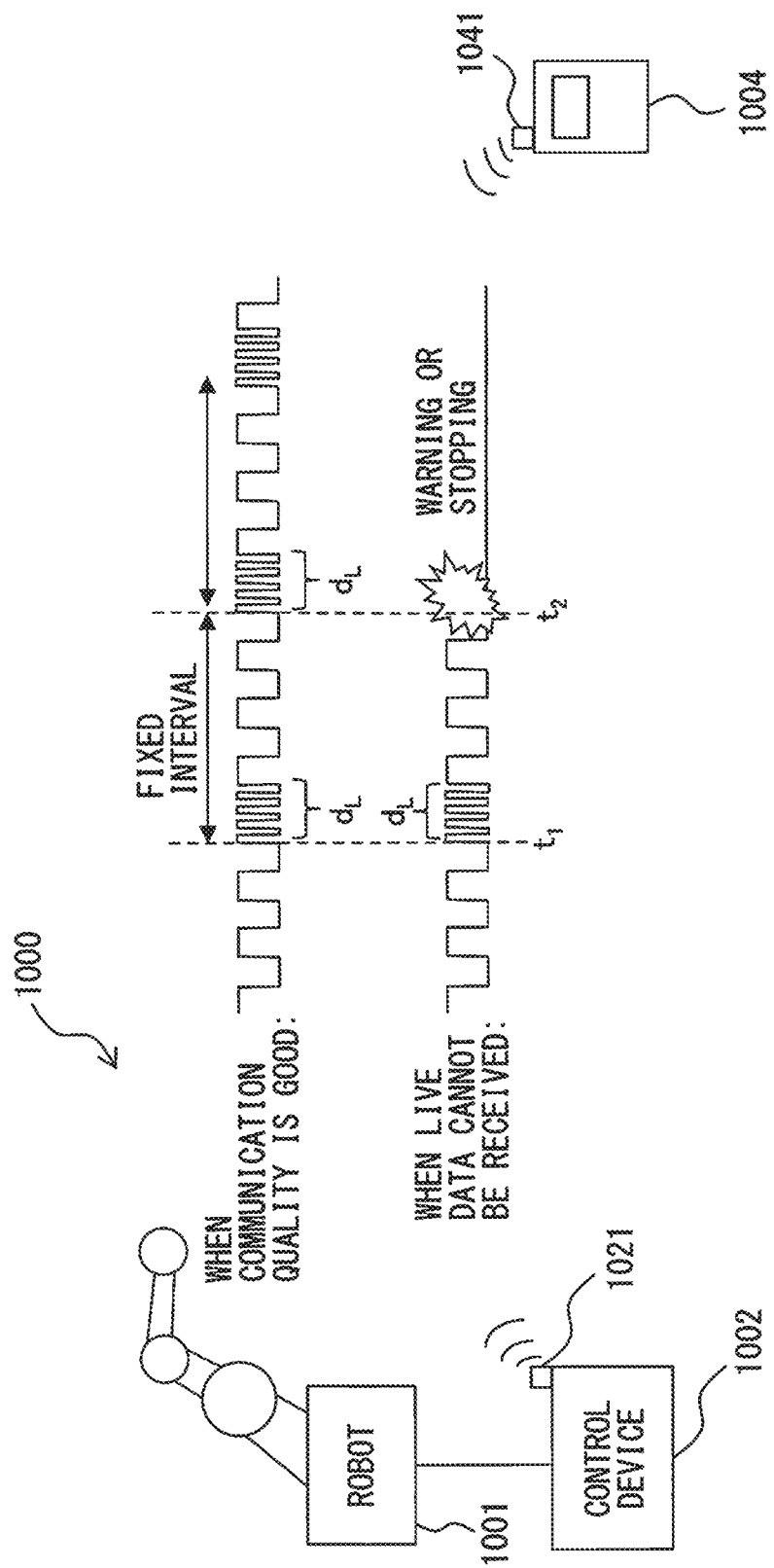
FIG. 1 is a configurational diagram showing a conventional automated machine system.

Referring now to the drawings, robot control systems according to the present invention will be described.

First Embodiment

Figure 2:
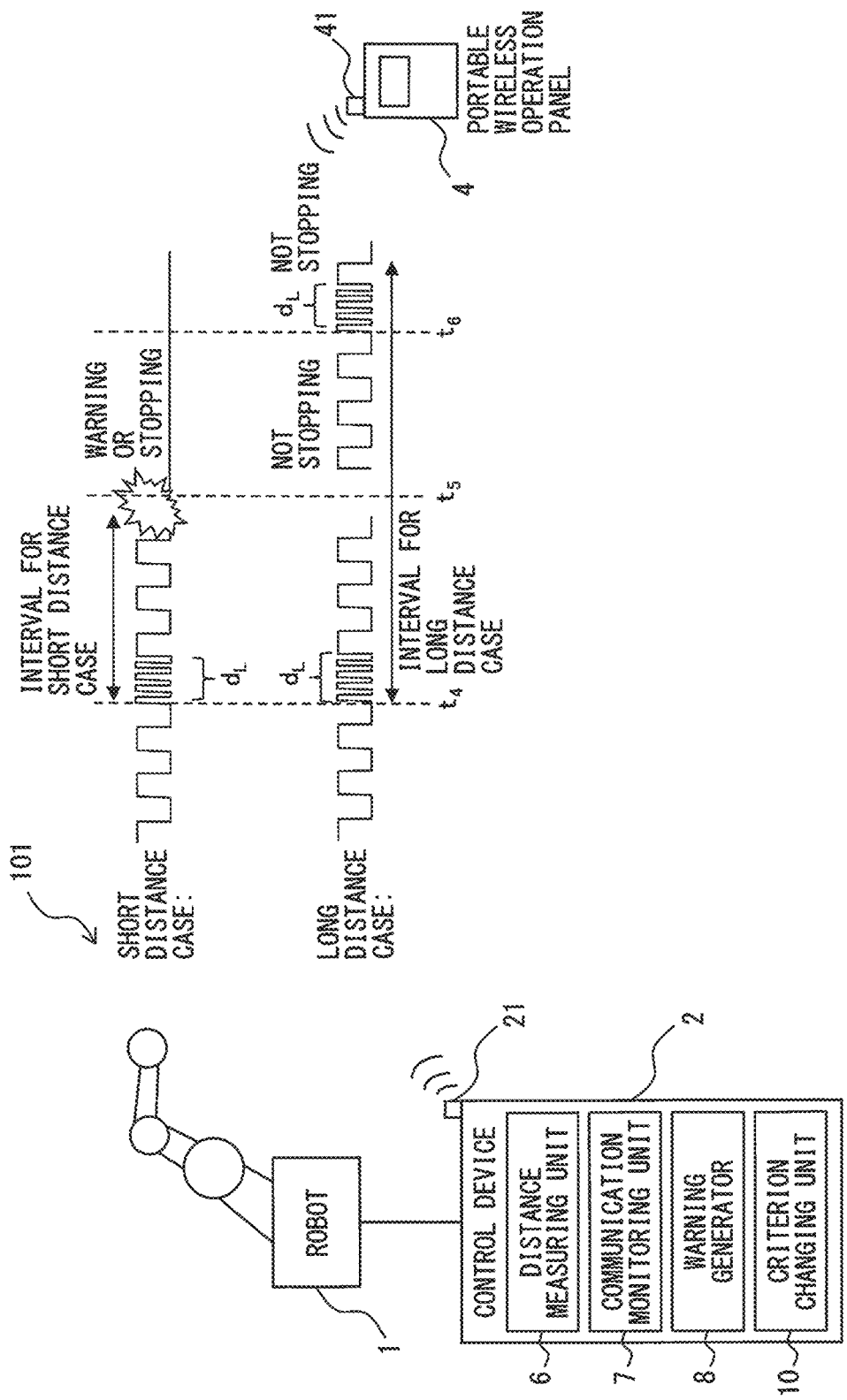
FIG. 2 is a configurational diagram showing a robot control system according to a first embodiment of the present invention.

A robot control system according to a first embodiment of the present invention will be described. FIG. 2 shows a configurational diagram showing a robot control system according to the first embodiment of the present invention. The robot control system 101 according to the first embodiment of the present invention includes a control device 2 for controlling a machine, i.e., a robot 1; a portable wireless operation panel 4 that can wirelessly communicate with the control device 2 to control the robot 1; a distance measuring unit 6 for measuring the distance between the robot 1 and the portable wireless operation panel 4; a communication monitoring unit 7 for monitoring the communication quality of wireless communication between the control device 2 and the portable wireless operation panel 4; a warning generator 8 for emitting a warning to the operator or stopping the robot 1 when the communication quality becomes lower than a predetermined criterion; and a criterion changing unit 10 for changing the predetermined criterion in accordance with the distance between the robot 1 and the portable wireless operation panel 4. Though the distance measuring unit 6, communication monitoring unit 7, warning generator 8 and criterion changing unit 10 are provided in the control device 2 in FIG. 2, the distance measuring device 6, communication monitoring unit 7, warning generator 8 and criterion changing unit 10 may be provided in the portable wireless operation panel 4 or may be provided in both the control device 2 and the portable wireless operation panel 4.

As shown in FIG. 2, the portable wireless operation panel 4 has a transceiver 41 to transmit commands for controlling the robot 1 wirelessly to a transceiver 21 on the control device side provided for the control device 2. The control device 2 controls the robot 1 based on the received commands.

The distance measuring unit 6 measures the distance between the robot 1 and the portable wireless operation panel 4. For example, the distance can be measured based on the intensity of the radio waves exchanged between the control device 2 and the portable wireless operation panel 4.

The communication monitoring unit 7 monitors the communication quality of wireless communication between the control device 2 and the portable wireless operation panel 4. The warning generator 8 determines whether or not the communication quality monitored by the communication monitoring unit 7 is equal to or higher than a predetermined criterion. The warning generator 8 emits a warning to the operator or stops the robot 1 when the communication quality is lower than the predetermined criterion.

The present invention is characterized in that the criterion changing unit 10 changes the aforementioned predetermined criterion in accordance with the distance between the robot 1 and the portable wireless operation panel 4.

For example, when the distance between the robot 1 and the portable wireless operation panel 4 is shorter than the predetermined distance, the criterion for judging communication quality is made stricter to ensure safety. On the other hand, when the distance between the robot 1 and the portable wireless operation panel 4 is further than the predetermined distance, the time taken to stop the robot when the communication quality degrades is made longer. However, since there is a large distance between the operator and the robot, the two will not interfere with each other, and therefore it is possible to ensure safety, avoid unnecessary stoppages, hence secure convenience.

For example, as a method of monitoring the communication quality between the control device 2 and the portable wireless operation panel 4, measurement of the exchanging interval of live data for confirming establishment of wireless communication can be used. Referring now to FIG. 2, how a warning is generated or how the robot is stopped based on communication quality will be described for each of the cases when the distance between the robot 1 and the portable wireless operation panel 4 is shorter than the predetermined distance and when the distance is further than the predetermined distance.

Live data $d_L$ is the data to be used to confirm whether or not wireless communication is performed normally, every predetermined period of time. Accordingly, when the live data $d_L$ cannot be received, it is determined that wireless communication is not performed normally. For example, FIG. 2 shows received waveforms when the transceiver 41 of the portable wireless operation panel 4 or the control device side transceiver 21 of the control device 2 transmits live data $d_L$ at $t_4$, $t_5$ and $t_6$.

When the distance between the robot 1 and the portable wireless operation panel 4 is shorter than the predetermined distance (which will be simply referred to hereinbelow as "short distance case"), the time interval at which live data $d_L$ has to be received is set short. In the example shown in FIG. 2, this interval is set to be the time period from time $t_4$ to $t_5$. In this case, when live data $d_L$ can be received at time $t_4$ but cannot be received at time $t_5$, the warning generator 8 emits a warning or stops the robot 1.

In contrast, when the distance between the robot 1 and the portable wireless operation panel 4 is further than the predetermined distance (which will be simply referred to hereinbelow as "long distance case"), the interval at which live data $d_L$ has to be received is set long. In the example shown in FIG. 2, this interval is set to be a time period longer than the time period from $t_4$ to $t_6$. In this case, even if live data $d_L$ cannot be received at the same interval as in short distance case or cannot be received at time $t_5$, the warning generator 8 will not emit a warning or stop the robot 1.

Further, when live data $d_L$ can be received within the time interval set for the long distance case, or, for example at time $t_6$, the warning generator 8 will not emit a warning or stop the robot 1.

It is also possible to provide such a system configuration that a warning is generated when the time period in which no live data has been received comes close to the predetermined criterion and the robot is stopped when the time period exceeds the predetermined criterion.

As described above, according to the robot control system of the first embodiment of the present invention, since the distance between the robot and the portable wireless operation panel is measured so as to change the criterion for communication quality of wireless communication, i.e., the interval at which the live data should be received, in accordance with the distance, it is possible to improve convenience without losing safety.

Second Embodiment

Figure 3:
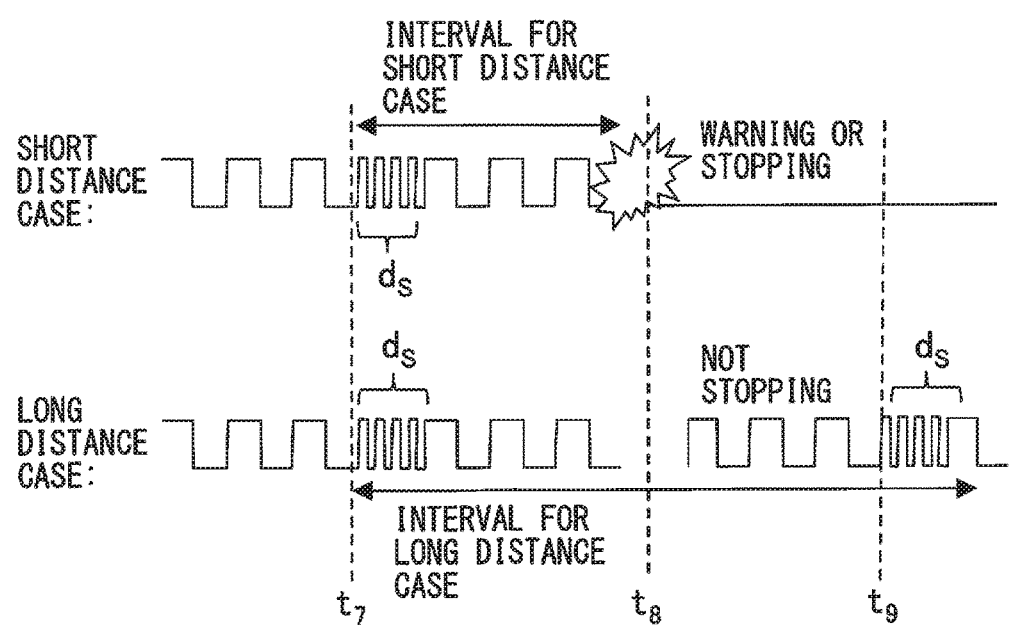
FIG. 3 is a timing chart of signals in a robot control system according to a second embodiment of the present invention.

Next, a robot control system according to a second embodiment of the present invention will be described. FIG. 3 shows the relationship between the signal waveform and the interval at which reception of safety signals are required when the distance between the robot and the portable wireless operation panel is shorter than the predetermined distance and when the distance is longer than the predetermined distance, in the robot control system according to the second embodiment of the present invention. The robot control system according to the second embodiment is different from the robot control system of the first embodiment in that communication quality is monitored by measuring the exchanging interval of safety signals that are exchanged between the control device and the portable wireless operation panel to indicate whether or not the machine or robot should be stopped. The other configurations according to the second embodiment are the same as those in the robot control system according to the first embodiment, so a detailed description is omitted.

The standards specify that the maximum moving distance of the robot from when the operator performs an action of inputting an emergency stop signal (pushing a bottom or the like) for stopping the robot up to the robot stopping, must be clearly provided. Therefore, the emergency stop signal is transmitted as a safety signal to be definitely confirmed within a certain period of time.

When the distance is short, the interval at which the safety signals should be confirmed is made short so as to promptly stop the robot and thereby ensure safety. On the other hand, when the distance is long, the interval at which the safety signals should be confirmed is made long so as to ensure convenience.

Even when the distance is long, the moving distance of the robot at the time of inputting the emergency stop signal must not exceed the maximum moving distance. Accordingly, in the case of the above operation, when the communication quality between the robot and the portable wireless operation panel is degraded at the time of a short distance case such that the safety signal has not been confirmed for a certain period of time, the robot will stop moving in a shorter distance than the maximum moving distance. The maximum moving distance is a value set by the manufacturer, and is not the distance to assure total safety. Therefore, making the robot stop moving a shorter distance than the maximum moving distance means an improvement of safety.

With reference to FIG. 3, description will be given on how a warning is generated or how the robot is stopped based on whether or not the safety signals have been received within the interval at which the safety signals should be received, for each of the cases when the distance between the robot 1 and the portable wireless operation panel 4 is shorter than the predetermined distance and when further than the predetermined distance.

It is judged that wireless communication is not performed normally when the safety signal $d_S$ cannot be received. For example, FIG. 3 shows received waveforms when the transceiver of the portable wireless operation panel or the control device side transceiver of the control device transmits safety data $d_S$ at $t_7$, $t_8$ and $t_9$.

When the distance between the robot 1 and the portable wireless operation panel 4 is shorter than the predetermined distance, the interval at which safety signals $d_S$ have to be received is set short. In the example shown in FIG. 3, this interval is set to be the time period from time $t_7$ to $t_8$. In this case, when the safety signal $d_S$ can be received at time $t_7$ but cannot be received at time $t_8$, the warning generator 8 emits a warning or stops the robot 1.

In contrast, when the distance between the robot 1 and the portable wireless operation panel 4 is further than the predetermined distance, the interval at which safety signals $d_S$ have to be received is set long. In the example shown in FIG. 3, this interval is set to be a time period longer than the time period from $t_7$ to $t_9$. In this case, even if the safety signal $d_S$ cannot be received at the same interval as in the short distance case, or cannot be received at time $t_8$, the warning generator 8 will not emit a warning or stop the robot 1.

Further, when the safety signal $d_S$ can be received within the interval set for the long distance case, or, for example at time $t_9$, the warning generator 8 will not emit a warning or stop the robot 1.

As described above, according to the robot control system of the second embodiment of the present invention, since the distance between the robot and the portable wireless operation panel is measured so as to change the criterion for communication quality of wireless communication, i.e., the interval at which the safety signals should be received, in accordance with the distance, it is possible to improve convenience without losing safety.

Third Embodiment

Figure 4:
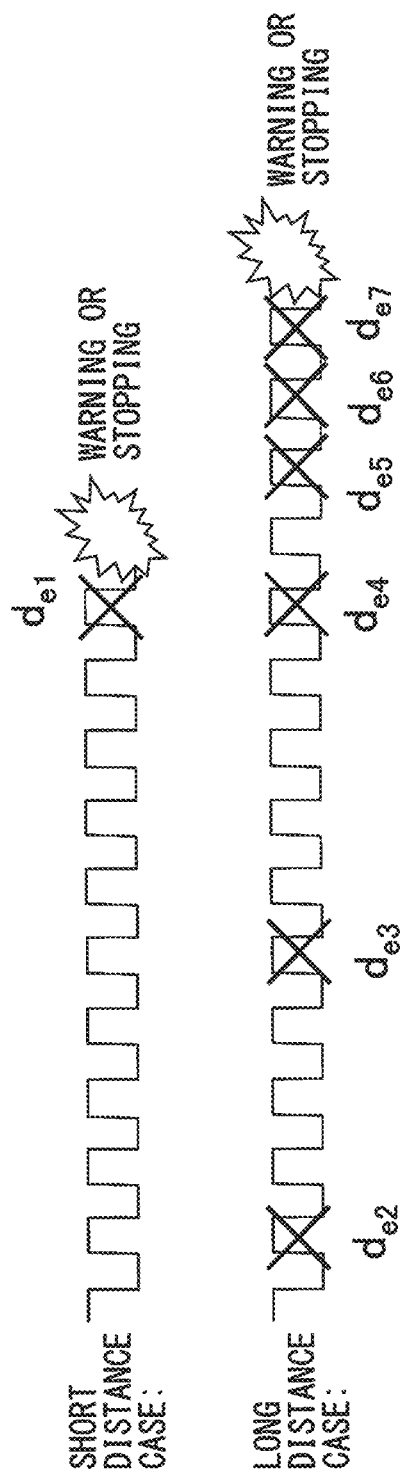
FIG. 4 is a timing chart of signals in a robot control system according to a third embodiment of the present invention.

A robot control system according to a third embodiment of the present invention will be described. FIG. 4 shows the relationship between the signal waveform and the time period within which reception of error corrected data is permitted when the distance between the robot and the portable wireless operation panel is shorter than the predetermined distance and when further than the predetermined distance, in the robot control system according to the third embodiment of the present invention. The robot control system according to the third embodiment is different from the robot control system of the first embodiment in that the communication quality is monitored by measuring the interval at which data with an error-detecting code or an error-correcting code that are exchanged between the control device 2 and the portable wireless operation panel 4 is transmitted in error free condition or by measuring frequency of errors. The other configurations according to the third embodiment are the same as those in the robot control system according to the first embodiment, and therefore a detailed description is omitted.

As shown in FIG. 4, when the distance between the robot 1 and the portable wireless operation panel 4 is shorter than the predetermined distance, a warning is emitted or the robot is stopped if error $d_{e1}$ is detected even once.

In contrast, when the distance between the robot and the portable wireless operation panel is distant, the time period in which reception of error-corrected data is permitted is set longer or the permissible frequency of error-corrected data is set higher. For example, if errors appear sporadically like errors $d_{e2}$, $d_{e3}$, $d_{e4}$ as shown in FIG. 4, the robot will not be stopped.

It is preferable that a warning is emitted or the robot is stopped when the number of times of consecutive errors or the frequency of errors exceeds the criterion. For example, in the example shown in FIG. 4, occurrence of two consecutive errors $d_{e5}$, $d_{e6}$ is permitted, but when three consecutive errors $d_{e5}$ to $d_{e7}$ take place, a warning is emitted or the robot is stopped. The occurrence of three consecutive errors is a mere example, and the number of consecutive errors is not limited to this example.

As described above, according to the robot control system of the third embodiment of the present invention, since the distance between the robot and the portable wireless operation panel is measured so as to change the criterion for communication quality of wireless communication, i.e., the number of times of errors or the frequency of errors, in accordance with the distance, it is possible to improve convenience without losing safety.

Fourth Embodiment

Figure 5:
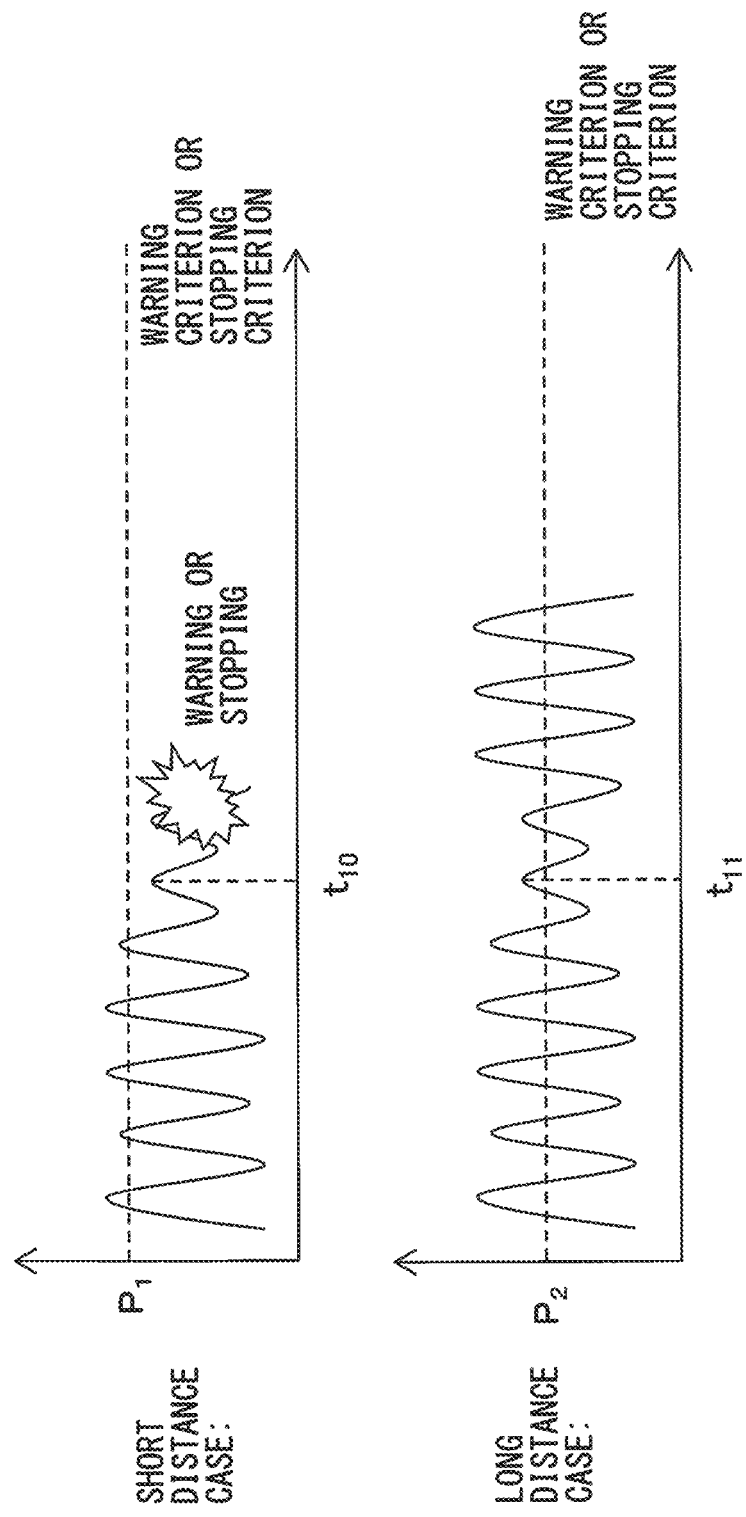
FIG. 5 shows signal waveforms in a robot control system according to a fourth embodiment of the present invention.

A robot control system according to a fourth embodiment of the present invention will be described. FIG. 5 shows the relationships between the signal waveform and the permissible radio wave intensity of the wireless communication signal when the distance between the robot and the portable wireless operation panel is shorter than the predetermined distance and when further than the predetermined distance, in the robot control system according to the fourth embodiment of the present invention. The robot control system according to the fourth embodiment is different from the robot control system of the first embodiment in that the communication quality is monitored by measuring the radio wave intensity of wireless communication. The other configurations according to the fourth embodiment are the same as those in the robot control system according to the first embodiment, so a detailed description is omitted.

When the distance between the robot and the portable wireless operation panel is longer than the predetermined distance, the permissible level of the radio wave intensity of wireless communication signals is set lower. For example, as shown in FIG. 5, when the distance between the robot and the portable wireless operation panel is shorter than the predetermined distance, a warning is emitted or the robot is stopped because the radio wave intensity of the wireless communication signal at time $t_{10}$ is lower than $P_1$, the warning or stopping criterion.

In contrast, when the distance between the robot and the portable wireless operation panel is far, no warning will be emitted or the robot will not be stopped because the radio wave intensity of the wireless communication signal at time $t_{11}$ is higher than $P_2$, the warning or stopping criterion.

As described above, according to the robot control system of the fourth embodiment of the present invention, since the criterion for the radio wave intensity of wireless communication signals to emit a warning or stop the robot is set at $P_2$ in the long distance case, which is lower than $P_1$ in the short distance case ($P_2 < P_1$), it is possible to improve convenience without losing safety.

Fifth Embodiment

A robot control system according to a fifth embodiment of the present invention will be described. FIG. 5 shows a configurational diagram of a robot control system according to the fifth embodiment of the present invention. The robot control system 105 according to the fifth embodiment is different from the robot control system 101 of the first embodiment in that the distance between the machine or robot 1 and the portable wireless operation panel 4 is measured by a sensor 16 including, at least, one of a laser sensor, a pressure sensor, an infrared sensor and a light curtain, arranged near the robot 1. The other configurations according to the fifth embodiment are the same as those in the robot control system according to the first embodiment, so a detailed description is omitted.

Figure 6:
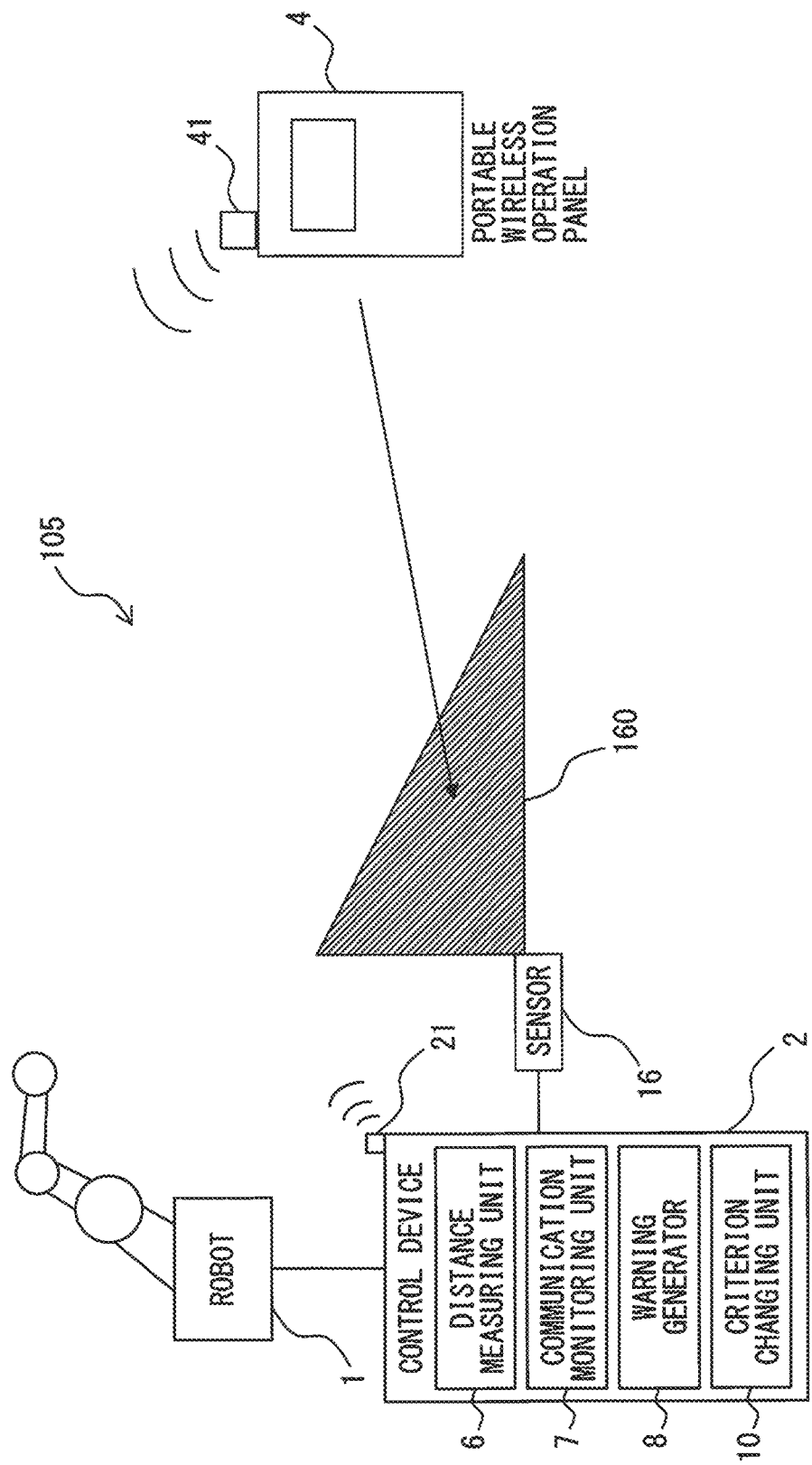
FIG. 6 is a configurational diagram of a robot control system according to a fifth embodiment of the present invention; and, FIG. 7 is a configurational diagram showing a robot control system according to a modified example of the fifth embodiment of the present invention.

Arrangement of the sensor 16 (a laser sensor, a pressure sensor, an infrared sensor, a light curtain and/or the like) capable of detecting entrance of an object near the robot 1 makes it possible to perceive the approach of the operator to the robot 1 when the operator carrying the portable wireless operation panel 4 enters a sensing range 160 of the sensor as indicated by an arrow in FIG. 6.

It is impossible for a light curtain and the like to perceive the distance continuously. However, no problem will occur if there is no need to define a number of levels for loosening the criterion of communication quality. For example, by arranging a sensor at the boundary inside which the robot is operated, it is possible to provide such a configuration that the criterion of communication quality is made strict when the operator resides within the operation range, whereas the criterion of communication quality is loosened when the operator is out of the operation range.

Further, it is not possible for the sensor alone to perceive whether or not the operator is carrying the portable wireless operation panel 4. However, when another means is used at the same time, for example, when an RFID (Radio Frequency Identifier) tag is mounted on the portable wireless operation panel, and therefore the RFID tag detector reads the tag when the portable wireless operation panel passes by the sensor, it is possible to perceive where the portable wireless operation panel 4 is, in a more reliable manner.

Figure 7:
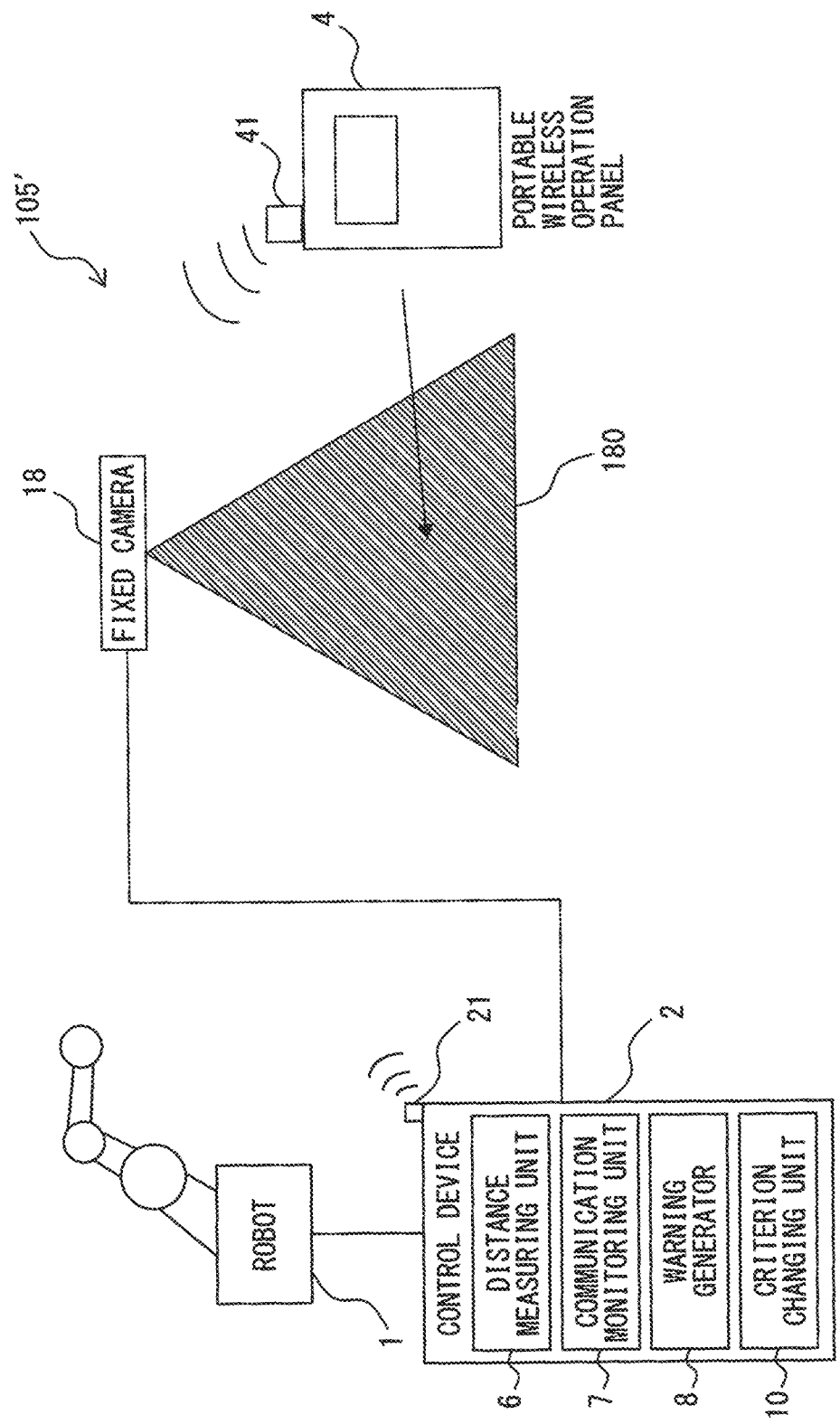

Instead of the sensor, a fixed camera 18 for taking an image of the surroundings of the machine or robot 1 may be arranged as in a robot control system 105' as a modified example of the fifth embodiment shown in FIG. 7, and therefore the distance between the machine or robot 1 and the portable wireless operation panel 4 can be measured by analyzing the image taken by the fixed camera 18. When the fixed camera 18 is installed, and if the operator carrying the portable wireless operation panel 4 enters within the imaging area 180 of the fixed camera 18, it is possible by image recognition to perceive at which position the operator carrying the portable wireless operation panel 4 is relative to the robot 1.

Determination of whether or not the operator is carrying a controllable portable wireless operation panel 4 can be realized by using an RFID tag or the like at the same time, similarly to the case of the sensor.

Not limited to the above examples, the means for measuring the distance between the robot and the portable wireless operation panel can be realized by using various devices in combination, and can be selected as appropriate depending on the various usage conditions (the ambient conditions in the factory (dirt, fine particles, temperature), the number of robots and operators, the number of portable wireless operation panels, the frequency at which the installed site of the robot is moved).

According to the robot control system of the embodiment of the present invention, since the distance between the robot and the portable wireless operation panel is measured so as to change the safety criterion for the quality of wireless communication, in accordance with the distance, it is possible to improve convenience without losing safety.

The invention claimed is:

1. A robot control system comprising:
 a control device for controlling a machine;
 a portable wireless operation panel for performing wireless communication with the control device to control the machine;
 a distance measuring unit for measuring the distance between the machine and the portable wireless operation panel;
 a communication monitoring unit for monitoring the communication quality of wireless communication between the control device and the portable wireless operation panel;
 a warning generator for emitting a warning to the operator or stopping the machine when the communication quality becomes lower than a predetermined criterion; and
 a criterion changing unit for changing the predetermined criterion in accordance with the distance between the machine and the portable wireless operation panel.

2. The robot control system according to claim 1, wherein the communication quality is monitored by measuring an exchanging interval of live data for confirming establishment of the wireless communication.

3. The robot control system according to claim 1, wherein the communication quality is monitored by measuring an exchanging interval of safety signals that are exchanged between the control device and the portable wireless operation panel to indicate whether or not the machine should be stopped.

4. The robot control system according to claim 1, wherein the communication quality is monitored by measuring the interval at which data with an error-detecting code or an error-correcting code that is exchanged between the control device and the portable wireless operation panel is exchanged in an error free condition or by measuring the frequency of errors.

5. The robot control system according to claim 1, wherein the communication quality is monitored by measuring radio wave intensity of the wireless communication.

6. The robot control system according to claim 1, wherein the distance between the machine and the portable wireless operation panel is measured by a sensor including, at least, one of a laser sensor, a pressure sensor, an infrared sensor and a light curtain, arranged near the machine.

7. The robot control system according to claim 1, wherein the distance between the machine and the portable wireless operation panel is measured by analyzing an image of surroundings of the machine taken by a fixed camera.

* * * * *